(12) United States Patent
Frisk et al.

(10) Patent No.: US 7,201,971 B2
(45) Date of Patent: Apr. 10, 2007

(54) PAPER PACKAGING MATERIAL FOR LIQUID FOOD AND METHOD FOR PRODUCTION THEREOF

(75) Inventors: Peter Frisk, Tokyo (JP); Kazuya Ono, Tokyo (JP); Hiroaki Ogita, Tokyo (JP)

(73) Assignee: Tetra Laval Holdings & Finance S.A., Pully (CH)

( * ) Notice: Subject to any disclaimer, the term of this patent is extended or adjusted under 35 U.S.C. 154(b) by 31 days.

(21) Appl. No.: 10/491,154

(22) PCT Filed: Sep. 25, 2002

(86) PCT No.: PCT/JP02/09890

§ 371 (c)(1),
(2), (4) Date: Sep. 27, 2004

(87) PCT Pub. No.: WO03/029099

PCT Pub. Date: Apr. 10, 2003

(65) Prior Publication Data

US 2005/0067127 A1    Mar. 31, 2005

(30) Foreign Application Priority Data

Sep. 27, 2001 (JP) ............................. 2001-296330
Sep. 27, 2001 (JP) ............................. 2001-296334

(51) Int. Cl.
*B32B 5/66* (2006.01)
(52) U.S. Cl. ............... 428/532; 428/533; 428/535; 428/536; 428/537.5; 427/326
(58) Field of Classification Search ............... 428/532, 428/533, 535, 536, 537.5
See application file for complete search history.

(56) References Cited

U.S. PATENT DOCUMENTS 6,872,459 B1 *   3/2005   Frisk et al. .............. 428/474.4

FOREIGN PATENT DOCUMENTS

| JP | 62-167627 U | 10/1987 |
|----|-------------|---------|
| JP | 4-89951 U   | 8/1992  |
| JP | 9-169091 A  | 6/1997  |
| JP | 11-277667 A | 10/1999 |
| JP | 2000-233419 A | 8/2000 |

* cited by examiner

*Primary Examiner*—Leszek Kiliman
(74) *Attorney, Agent, or Firm*—Buchanan, Ingersoll & Rooney PC

(57) ABSTRACT

In the manufacture of a paper container from packaging materials, damage of internal layers of packaging materials is promptly inspected, and degradation by light exposure of content can be prevented. A method of manufacturing light barrier paper packaging materials for liquid food formed from a laminate having a paper layer, a thermoplastic resin outside layer, and a thermoplastic resin inside layer include preparing a substantially completely bleached white bleached paper layer, providing a light barrier layer of light barrier material on the inside of the bleached paper layer before or during lamination of the thermoplastic resin inside layer, and inspecting for defects of the obtained laminate by observation of the visible or invisible inside surface of the bleached paper layer from the thermoplastic resin inside layer side of the obtained laminate through the light barrier layer.

24 Claims, No Drawings

PAPER PACKAGING MATERIAL FOR LIQUID FOOD AND METHOD FOR PRODUCTION THEREOF

BACKGROUND

Paper packaging materials for liquid food having excellent light barrier ability and a method of manufacturing are disclosed.

A method of manufacturing paper packaging materials for liquid food provides for promptly finding damage of the inside layers of a paper layer as a core layer having excellent light barrier ability.

Paper containers comprised of a laminated material of paper and thermoplastic resin are widespread as a container of liquid food, such as juice, coffee, milk, and liquor.

As for the paper container, the outermost layer (layer contacting outside air) and an innermost layer (layer contacting liquid food) usually consist of a thermoplastic resin layer. However, the paper container is a poor light barrier. Contents of milk and the like are deteriorated due to visible light.

For contents that are sensitive to ultraviolet light, aroma is decreased by transmitted ultraviolet light.

In order to make the paper container have light barrier capabilities, laminating aluminum foil or surface-coating carbon black are not practical in view of point of cast-problem and environment.

While filling up liquid food in a paper container and manufacturing packaging materials for the paper container, the internal layer of the packaging materials may have small defects like pinholes. With pinholes, liquid food contents leak out and reach the paper layer. The contents cannot be protected.

Conventionally, a method of using coloring ink forcefully is employed to inspect damage of the internal layer. However, the test method is complicated and requires much time.

SUMMARY

Packaging materials for liquid food, and a manufacturing method of packaging materials for liquid food, having excellent light-barrier properties, which can provide for promptly judging the damage of an internal layer of the paper container packaging materials while manufacturing a paper container from packaging materials and preventing deterioration of contents by light irradiation, are provided.

Using the packaging materials, which do not transmit light in the range of 200–600 nm, or the packaging materials with almost no transmission, is suitable to improve the quality of the packaging materials for liquid food.

A method of manufacturing paper packaging materials for liquid food formed from a laminate having a paper layer, a thermoplastic resin outside layer and a thermoplastic resin inside layer comprises preparing a substantially completely bleached white bleached paper layer of weight of 50–350 g/m$^2$.

A light barrier layer of light barrier material is provided on the inside of a bleached paper layer before, or during, lamination of the thermoplastic resin inside layer. A defect of the obtained laminate is inspected by observation of the visible or invisible inside surface of the bleached paper layer from the thermoplastic resin inside layer side of the obtained laminate through the light barrier layer.

In a preferred embodiment of the manufacturing method, a thermoplastic resin layer on the inside of bleached paper layer contains blue pigment, yellow pigment and white pigment.

In a preferred embodiment of the manufacturing method, the thermoplastic resin layer containing the pigment includes three kinds of thermoplastic resin layers containing different pigments from each other.

In a preferred embodiment of the manufacturing method, the thermoplastic resin layer containing the pigment includes a thermoplastic resin layer containing one kind of the above pigments and a thermoplastic resin layer containing the other pigments.

In a preferred embodiment of the manufacturing method, the thermoplastic resin outside layer of the outside of bleached paper layer further contains white pigment.

In a preferred embodiment of the manufacturing method, a dark color pigment containing layer is provided on the inside of the bleach paper layer, and a transparent thermoplastic resin inner layer is provided on the inside of the dark color pigment-containing layer.

In a preferred embodiment of the manufacturing method, the dark color pigment-containing layer directly contacts the bleached paper layer.

The paper packaging materials for liquid food are formed from laminated material having a paper layer, a thermoplastic resin outside layer and thermoplastic resin inside layer. The paper layer is a substantially completely bleached white bleached paper layer with a weight of 50–350 g/m$^2$, and the thermoplastic resin layer on the inside of the paper layer contains blue pigment, yellow pigment and white pigment.

In a preferred embodiment of the liquid food paper packaging materials, the thermoplastic resin layer containing pigment includes three kinds of thermoplastic resin layers that contain different pigments from each other.

In a preferred embodiment of the liquid food paper packaging materials, the thermoplastic resin layers containing the pigments include a thermoplastic resin layer containing one kind of the pigment and a thermoplastic resin layer containing the other pigments.

In a preferred embodiment of the liquid food paper packaging materials, the thermoplastic resin layer on the outside of the bleached paper layer further contains white pigment.

Another embodiment of paper packaging materials for liquid food are formed from a laminated material having a paper layer, a thermoplastic resin outside layer, and thermoplastic resin inside layer. The paper layer is a substantially completely bleached white bleached paper layer with a weight of 50–350 g/m$^2$, a dark color pigment-containing layer is provided on the inside of the paper layer, and a transparent thermoplastic resin inner layer is provided on the inside of the dark color pigment-containing layer.

In a preferred embodiment of the liquid food paper packaging materials, the dark color pigment-containing layer directly contacts the bleached paper layer.

DETAILED DESCRIPTION OF PREFERRED EMBODIMENTS

White paper substantially completely bleached with chlorine, ozone and ammonia is used for a paper layer constituting packaging materials described herein. The paper has a weight of 50–350 g/m$^2$.

The thermoplastic resin of one layer of packaging materials includes polyolefin, polyamide, polyester, polyvinyl-chloride, polystyrene, methacrylic resin, ethylene-α-unsaturated carboxylic acid copolymer, ionomer, unsaturated carboxylic acid modified polyolefin, cyclic olefin copolymer, ethylene-vinyl alcohol copolymer, polyvinyl alcohol having a saponification degree of over 95%, and acetyl cellulose.

The polyolefin includes polyethylene, polypropylene, ethylene-propylene copolymer and polybutene-1. The polyamide includes polyamide 6, polyamide 6-6, polyamide 11 and polyamide 12. The polyester includes polyethylene terephthalate and polybutylene terephthalate. Polyolefin is more preferable. The polyethylene includes high-density polyethylene, middle-density polyethylene, low-density polyethylene, linear low-density polyethylene and linear low-density polyethylene (mLLDPE) produced by using metallocene catalyst. The above polyethylene is preferable.

In addition, mLLDPE can be manufactured by copolymerizing ethylene and α-olefin comonomer having 4–8 carbons under a metallocene catalyst. The thermoplastic resin layer includes over two layers, as well as one layer. The thickness of the thermoplastic resin layer is usually 5–200 µm.

In one embodiment, the packaging materials comprise the thermoplastic resin layer containing blue pigment, yellow pigment and white pigment, and being provided on the inside of the paper layer. The pigment can be used separately, by being mixed, and by being mixed in the multilayered structure.

Examples of the packaging materials comprising the laminated material combined with the paper layer and the thermoplastic resin layer containing the pigment include thermoplastic resin layer/paper layer/blue pigment containing thermoplastic resin layer/yellow pigment containing thermoplastic resin layer/white pigment containing thermoplastic resin layer; thermoplastic resin layer/paper layer/thermoplastic resin layer/thermoplastic resin layer containing blue pigment, yellow pigment and white pigment/thermoplastic resin layer; and thermoplastic resin layer/paper layer/thermoplastic resin layer/thermoplastic resin layer containing blue pigment and yellow pigment/thermoplastic resin layer containing white pigment.

In addition, the thermoplastic resin layer, which contains white pigment, can be arranged outward of the above packaging materials. For example, the packaging materials can include white pigment-containing thermoplastic resin layer/paper layer/blue pigment- and yellow pigment-containing thermoplastic resin layer/white pigment-containing thermoplastic resin layer. In addition, in this example, the left-side end layer is an outermost layer, and the right-side end layer is an innermost layer.

For the typical example of above pigment, for blue pigment, permanent blue, phthalocyanine pigment and cyanine pigment; for yellow pigment, cobalt yellow, azo pigment and yellow iron oxide; and for white pigment, titanium white (titanium dioxide) and zinc oxide, are included.

In the packaging materials for liquid food, the above-mentioned pigment is safe in food hygiene.

The above pigment is used in powder type, and the average particle size is usually approximately 0.2–5 µm.

In addition, a content of the pigment in the colored thermoplastic resin layer is usually 0.5–30 weight %.

The above blue pigment can reflect visible light of 550–600 nm wave length, the above yellow pigment can reflect visible ray of 400–550 nm wave length, and the above white pigment can reflect light of less than 400 nm wave length, particularly visible rays of 200–400 nm wave length and less.

Light of a wide range of 200–600 nm cannot be penetrated by combination of blue pigment, yellow pigment and white pigment.

In another embodiment, the packaging materials contain a dark color pigment-containing layer provided on the inside of the paper layer. The dark color pigment includes blue pigment, black pigment, body gray pigment, dark green pigment, dark brown pigment, and body red pigment. The pigments can be used by mixing more than two kinds, as well as by choosing one kind, of pigment.

Packaging materials of this invention are for liquid food, and are safe in food hygiene.

A dark color pigment-containing layer is arranged on the inside of above paper layer. The dark color pigment-containing layer is desirably arranged so as to contact with the paper layer, particularly.

A method of preparing the dark color pigment-containing layer includes, for example, extruding a mixture with the resin and dark color pigment, coating a lacquer-containing dark color pigment to the inside of the paper layer, and printing the dark color pigment in the inside of the paper layer.

The resin to mix with dark color pigment preferably includes the above-mentioned thermoplastic resin, particularly polyolefin.

A content of the pigment in the lacquer-containing dark color pigment and mixture with the resin and the dark color pigment is usually 0.5–30 wt %. When the dark color pigment-containing layer is not arranged next to the paper layer, the layer formed between the dark color pigment containing layer and paper layer is a transparent layer.

The preferred transparent layer includes the following transparent resin layer. The thickness of the dark color pigment-containing layer is usually 2–50 µm.

The resin of the transparent resin layer preferably includes thermoplastic resin, e.g. polyolefin, polyester, polyvinylchloride, polystyrene, methacrylic resin, ionomer, ethylene-vinyl alcohol copolymer, and acetyl cellulose. Polyolefin is particularly preferable.

The transparent resin layer contains one layer or more than two layers.

The transparent resin layer is desirably arranged so as to contact with the dark color pigment containing layer, particularly.

The innermost layer of the packaging materials can be formed by the following transparent resin layer, desirably polyethylene. The thickness of the transparent resin layer is usually 5–200 µm.

The thermoplastic resin arranged outward of above paper layer is desirably polyolefin. Polyethylene is particularly preferable.

The polyethylene includes high-density polyethylene, middle-density polyethylene, low-density polyethylene, linear low-density polyethylene and mLLDPE, particularly desirable are middle-density polyethylene and high-density polyethylene.

In addition, the innermost layer of packaging materials includes preferably polyethylene, and more preferably linear low-density polyethylene and mLLDPE.

The thickness of the thermoplastic resin layer with or without pigment is usually 5–200 µm.

The packaging materials comprise a laminated material of the paper layer and the thermoplastic resin layer. In addition to the layers, laminated material laminated by, for example, a barrier film layer and an adhesive layer may be formed.

The barrier layer includes a single layer of the barrier material and the multilayered layers including a barrier material.

The barrier material includes aluminum foil, silicon oxide vapor deposition polyethylene phthalate, ethylene vinyl alcohol copolymer and nylon resin. The multilayered layers including a barrier material include polyethylene film/aluminum foil, adhesive polyethylene/biaxial stretching film of silicon oxide vapor deposition polyethylene terephthalate(/adhesive), polyethylene film/adhesive/ethylene-vinyl alcohol copolymer film/adhesive, and nylon resin film/adhesive.

The thickness of the barrier layer is usually 5–25 µm.

The adhesive layer includes, for example, acrylic resin system adhesive, modified polyolefin system adhesive, ethylene-vinyl acetate copolymer, polyamide system adhesive and epoxide resin adhesive.

The acrylic resin adhesive includes polymer and copolymer of acrylic acid, methacrylic acid and alkyl ester thereof.

The modified polyolefin adhesive includes polyethylene, polypropylene grafted by unsaturated carboxylic acid or the anhydride of acrylic acid, methacrylic acid, maleic acid, maleic anhydride, fumaric acid, and itaconic acid under organic peroxide.

The thickness of the adhesive layer is usually 5–30 µm.

The packaging materials comprise the laminated material of the above-mentioned layers.

In the manufacturing method of the packaging materials, the method of laminating layers thereof includes laminating layers by using the adhesive, heat-fusing thermofusion-possible layers, simultaneously extruding thermofusion layers, a combination thereof, and conventional methods.

The shape of a container formed by packaging materials includes well-known shapes and optional shapes, e.g., pouch type, a gable-top shape of a carton for milk, cube, cylinder type, and brick type.

EXAMPLES

Examples and Comparative Examples are as follows.

Example 1-1

Low density polyethylene (LDPE) having a density of 0.924 g/cm$^3$ films (20 µm thickness) (outermost layer)/bleached paper (weight 300 g/m$^2$)/5 wt % blue pigment (cyanine pigment) containing LDPE film (15 µm thickness)/5 wt % yellow pigment (yellow iron oxide) containing LDPE film (15 µm thickness)/5 wt % white pigment (titanium dioxide)-containing linear low density polyethylene (LLDPE) having a density of 0.910 g/cm$^3$ film (15 µm thickness) (innermost layer) was manufactured as a laminated material.

In evaluation of light barrier performance of a laminate obtained by the above Example 1-1, by using a spectrum UV meter, transmittance was measured in the wavelength range of 200–600 nm. The result of the transmittance measurement was less than 5%.

Example 1-2

Laminated material of LDPE film (outermost layer) used with Example 1/bleached paper used with Example 1-1/LDPE film (15 µm thickness) of Example 1-1/LDPE film (30 µm thickness) of Example 1-1 containing 5 wt % white pigment, 5 wt % yellow pigment and 5 wt % blue pigment/a film comprising mLLDPE having a density of 0.908 g/cm$^3$, MFI: 16 g/10 min., SR 1.5, 98° C. maximum melting temperature by differential thermal analysis (15 µm) (innermost layer) was manufactured.

The result of a transmittance evaluation of the laminate manufactured by the above Example 1-2 with the evaluation as described in Example 1-1 was less than 5%.

Example 1-3

Laminated material of LDPE film (outermost layer) used with Example 1/bleached paper used with Example 1-1/LDPE film (15 µm thickness) of Example 1-1/LDPE film (30 µm thickness) of Example 1 containing 5 wt % yellow pigment and 5 wt % blue pigment/a film comprising LLDPE (used with Example 1-1) containing 5 wt % white pigment (innermost layer) was manufactured.

The result of a transmittance evaluation of the laminate manufactured by the above Example 1-3 with the evaluation as described in Example 1-1 was less than 5%.

Example 1-4

Laminated material of film comprising LLDPE (used with Example 1-1) containing 5 wt % white pigment (outermost layer)/bleached paper used with Example 1-1/LDPE film (30 µm thickness) of Example 1 containing 5 wt % yellow pigment and 5 wt % blue pigment/film comprising LLDPE (used with Example 1-1) containing 5 wt % white pigment (innermost layer) was manufactured.

The result of a transmittance evaluation of a laminate manufactured by the above Example 1-4 with the evaluation as described in Example 1-1 was less than 5%.

Comparative Example 1-1

The laminated material comprising LDPE film (outermost layer) used with Example 1-1/bleached paper used with Example 1-1/LLDPE film (innermost layer) used with Example 1-1 was manufactured.

The result of a transmittance evaluation of the laminate manufactured by the above Comparative Example 1-1 with the evaluation as described in Example 1-1 was more than 70%.

Comparative Example 1-2

The laminated material was manufactured as in Example 1-1, except for not using the LDPE film containing blue pigment.

The result of a transmittance evaluation of the laminate manufactured with the evaluation as described in Example 1-1 was more than 70%.

Comparative Example 1-3

The laminated material was manufactured as in Example 1-1, except for not using the LDPE film containing yellow pigment.

The result of a transmittance evaluation of the laminate manufactured with the evaluation as described in Example 1-1 was more than 70%.

Comparative Example 1-4

The laminated material was manufactured as in Example 1-1, except for not using the LDPE film containing white pigment.

The result of a transmittance evaluation of the laminate manufactured with the evaluation as described in Example 1-1 was more than 70%.

From the results of the Examples and Comparative Examples, the packaging materials of Examples 1-1, 1-2, 1-3 and 1-4 comprising laminated material having a polyolefin layer containing blue pigment, yellow pigment and white pigment reflected light of a wave length of 200–600 nm.

On the other hand, the packaging materials of Comparative Examples 1-2, 1-3 and 1-4 comprised of a laminated material having a polyolefin layer not containing any blue pigment, yellow pigment and white pigment, respectively, and the packaging materials of Comparative Example 1-1 comprising laminated material having a polyolefin layer not containing blue pigment, yellow pigment and white pigment, do not reflect light of a wave of length 200–600 nm Example 2-1

A laminated material of LDPE film (20 μm thickness) 0.924 g/cm$^3$ density (outermost layer)/bleached paper (weight 300 g/m$^2$)/extruded LDPE (0.910 g/cm$^3$ density) film (15 μm thickness) containing black pigment (30 wt % master batch of carbon black)/LLDPE film (20 μm thickness) (innermost layer) was manufactured.

Example 2-2

Except for using a master batch of 25 wt % blue pigment (cyanine pigment), instead of the master batch of black pigment, laminated material of LDPE film (20 μm thickness) (outermost layer)/bleach paper/LDPE film (20 μm thickness) containing blue pigment/LLDPE film (20 μm thickness) (innermost layer) was manufactured as in Example 2-1.

Example 2-3

A laminated material of LDPE film (20 μm thickness) used with Example 1 (an outermost layer)/bleached paper used with Example 1/coated lacquer layer (20 μm thickness) containing black pigment (3 wt % carbon black)/mLLDPE film (20 μm thickness) (innermost layer) having a 98° C. maximum melting temperature by differential thermal analysis, MFI: 1, 16 g/10 minute, SR1.5, 0.908 g/cm$^3$ density was manufactured with an extrusion method.

Example 2-4

Except for using a lacquer of 25 wt % blue pigment (cyanine pigment) instead of the lacquer layer of black pigment, laminated material of LDPE film (20 μm thickness) (outermost layer)/bleached paper/lacquer layer (20 μm thickness) containing blue pigment/mLLDPE film (20 μm thickness) (innermost layer) was manufactured as in Example 2-3.

Comparative Example 2-1

The laminated material of LDPE film (an outermost layer)/bleached paper/LDPE film/LLDPE film (an innermost layer) was manufactured as in Example 2, except using the LDPE not containing blue pigment instead of the master batch of black pigment.

Comparative Example 2-2

The laminated material of LDPE film (outermost layer)/bleached paper/no color lacquer layer/mLLDPE film (innermost layer) was manufactured as in Example 2-4, except for using lacquer not containing blue pigment instead of the lacquer with blue pigment.

Regarding the laminated material manufactured in Examples 2-1, 2-2, 2-3 and 2-4 and Comparative Examples 2-1 and 2-2, with a spectra UV meter, transmittance was measured in the wave length range of 400–600 nm and light barrier performance thereof was evaluated.

Results thereof are shown in Table 1.

TABLE 1

| Trans-mittance | Example 2-1 | Example 2-2 | Example 2-3 | Example 2-4 | Comparative Example 2-1 | Comparative Example 2-2 |
|---|---|---|---|---|---|---|
| | Less than 5% | Less than 40% | Less than 10% | Less than 50% | More than 70% | More than 70% |

From Table 1, a container made from the laminated material of Examples 2-1, 2-2, 2-3 and 2-4, and particularly the laminated material of Examples 2-1 and 2-3, showed superior light barrier performance, as compared with a container made from the laminated material of Comparative Examples 2-1 and 2-2.

In addition, regarding the laminated material manufactured by Examples 2-1, 2-2, 2-3 and 2-4 and Comparative Examples 2-1 and 2-2, the inner layer of the bleached paper of the laminated material was inspected for pin-holes during process steps of a brick-type liquid food container containing 200 ml.

In the laminated material of Examples 1-4, with easy and prompt judgment, bleached paper due to pin holes were found by visual observation.

By the following conventional test method with needed complexity, the laminated material of Comparative Examples 1 and 2 was inspected.

(Conventional Test Method)

A container is divided in half of the top and bottom with a craft knife, after taking out the content from the container. Pouring red ink into a washed and dried container, pin-hole inspection was performed after air drying about 24 hours. The air-drying was used to avoid stress of the container in the drying process.

(Advantage)

As shown in the Examples, the packaging materials can reflect light in the wide range of 200–600 nm. Therefore, degradation of liquid food filled in the container by exposure to light rays made with the packaging materials is prevented.

Conventional packaging materials need the purge of back pigment of carbon black in the resin layer from an apparatus used for packaging materials manufacture. In packaging materials described herein, colored resins can be easily changed from one colored resin to the other, and the purge amount can be reduced.

Regarding cost and environment, by not using metal materials, e.g., Al foils, problems can be reduced.

While liquid food is filled in packaging materials containers described herein, a paper container can be judged promptly for any damage of internal layers of the packaging materials. The judgment can be done in the manufacture of a paper container from packaging material and in filling of liquid food into the paper container without any problem with respect to environment and process condition.

INDUSTRIAL APPLICABILITY

The packaging materials and the manufacturing methods are used to pack milk, juice, refined sake, shochu, mineral water and liquid food of other drinks.

The invention claimed is:

1. A method of manufacturing paper packaging materials for liquid food formed from a laminate comprising a paper layer, a thermoplastic resin outside layer on the outside of the paper layer and a thermoplastic resin inside layer on the inside of the paper layer, the method comprising:
preparing a substantially completely bleached white bleached paper layer having a weight of 50–350 g/m$^2$;
providing a light barrier layer of light barrier material on the inside of the bleached paper layer before, or during, the lamination of the thermoplastic resin inside layer; and
inspecting for defects of the obtained laminate by observation of the visible or invisible inside-surface of the bleached paper layer from the thermoplastic resin inside layer side of the obtained laminate through the light barrier layer.

2. The manufacturing method according to claim 1, wherein the thermoplastic resin inside layer on the inside of the bleached paper layer contains blue pigment, yellow pigment and white pigment.

3. The manufacturing method according to claim 2, wherein the thermoplastic resin inside layer comprises three thermoplastic resin layers containing different pigments from each other.

4. The manufacturing method according to claim 2, wherein the thermoplastic resin inside layer containing the pigment comprises a thermoplastic resin layer containing one of the blue, yellow and white pigments and a thermoplastic resin layer containing the other two of the blue, yellow and white pigments.

5. The manufacturing method according to claim 2, wherein the thermoplastic resin outside layer on the outside of the bleached paper layer comprises white pigment.

6. The manufacturing method according to claim 1, wherein a dark color pigment-containing layer is provided on the inside of the bleached paper layer, and a transparent thermoplastic resin inner layer is provided on the inside of the dark color pigment-containing layer.

7. The manufacturing method according to claim 1, wherein the light barrier layer directly contacts with the bleached paper layer.

8. A paper packaging material for liquid food, comprising:
laminated material comprising a paper layer, a thermoplastic resin outside layer on the outside of the paper layer, and a thermoplastic resin inside layer on the inside of the paper layer;
wherein the paper layer is a substantially completely bleached white bleached paper layer having a weight of 50–350 g/m$^2$, and the thermoplastic resin inside layer inside of the bleached paper layer contains blue pigment, yellow pigment and white pigment;
wherein all other layers of the paper packaging material than the thermoplastic resin inside layer have light transmittance properties such that the laminated material can be inspected for defects by observation of the visible or invisible inside-surface of the bleached paper layer from the thermoplastic resin inside layer side of the laminated material through the thermoplastic resin inside layer.

9. The paper packaging material according to claim 8, wherein the thermoplastic resin inside layer comprises three thermoplastic resin layers that contain different pigments from each other.

10. The paper packaging material according to claim 8, wherein the thermoplastic resin inside layer comprises a thermoplastic resin layer containing one of the blue, yellow and white pigments and a thermoplastic resin layer containing the other two of the blue, yellow and white pigments.

11. The paper packaging material according to claim 8, wherein the thermoplastic resin outside layer outside of the bleached paper layer comprises white pigment.

12. A paper packaging material for liquid food, comprising:
laminated material comprising a paper layer, a thermoplastic resin outside layer on the outside of the paper layer, and a thermoplastic resin inside layer on the inside of the paper layer;
wherein the paper layer is a substantially completely bleached white bleached paper layer having a weight of 50–350 g/m$^2$, a dark color pigment-containing layer is provided on the inside of the bleached paper layer, and a transparent thermoplastic resin inner layer is provided on the inside of the dark color pigment-containing layer;
wherein all other layers of the paper packaging material than the dark color pigment-containing layer have light transmittance properties such that the laminated material can be inspected for defects by observation of the visible or invisible inside-surface of the bleached paper layer from the thermoplastic resin inside layer side of the laminated material through the dark color pigment-containing layer.

13. The paper packaging material according to claim 12, wherein the dark color pigment-containing layer directly contacts with the bleached paper layer.

14. The paper packaging material according to claim 8, wherein the thermoplastic resin inside layer is a single layer containing the blue, yellow and white pigments.

15. The paper packaging material according to claim 8, which has a light transmittance in the wavelength range of 200–600 nm of less than 5%.

16. A container for liquid food comprising the paper packaging material according to claim 8.

17. The paper packaging material according to claim 12, which has a light transmittance in the wavelength range of 400–600 nm of less than 10%.

18. The paper packaging material according to claim 12, wherein the pigment-containing layer contains black pigment.

19. The paper packaging material according to claim 18, wherein the pigment-containing layer is an extruded film containing the black pigment.

20. A container for liquid food comprising the paper packaging material according to claim 12.

21. The paper packaging material according to claim 8, wherein the thermoplastic resin inside layer directly contacts with the bleached paper layer.

22. The paper packaging material according to claim 8, wherein only (i) the thermoplastic resin inside layer containing the blue, yellow and white pigments, and (ii) a thermoplastic resin layer without pigments which is disposed inside of the thermoplastic resin inside layer containing the blue, yellow and white pigments are provided on the inside of the bleached paper layer.

23. The paper packaging material according to claim 8, wherein only (i) the thermoplastic resin inside layer containing the blue, yellow and white pigments, (ii) a thermoplastic resin layer without pigments which is disposed inside of the thermoplastic resin inside layer containing the blue, yellow and white pigments and (iii) a thermoplastic resin layer without pigments which is disposed outside of the thermoplastic resin inside layer containing the blue, yellow and white pigments are provided on the inside of the bleached paper layer.

24. The paper packaging material according to claim 12, wherein only (i) the dark color pigment-containing layer and (ii) the transparent thermoplastic resin inner layer which is disposed on the inside of the dark pigment-containing layer are provided on the inside of the bleached paper layer.

\* \* \* \* \*